United States Patent [19]

Kaldor et al.

[11] 4,302,305

[45] Nov. 24, 1981

[54] ISOTOPE SEPARATION PROCESS

[75] Inventors: Andrew Kaldor, Berkeley Heights, N.J.; Paul Rabinowitz, Old Bethpage, N.Y.

[73] Assignee: Exxon Research & Engineering Co., Florham Park, N.J.

[21] Appl. No.: 883,722

[22] Filed: Mar. 6, 1978

Related U.S. Application Data

[63] Continuation-in-part of Ser. No. 797,390, May 16, 1977, which is a continuation of Ser. No. 614,623, Sep. 18, 1975, and a continuation-in-part of Ser. No. 840,049, Oct. 6, 1977, which is a continuation of Ser. No. 715,449, Aug. 18, 1976, which is a continuation-in-part of Ser. No. 614,623, Sep. 18, 1975.

[51] Int. Cl.$^3$ .................... B01D 59/00; B01D 59/34
[52] U.S. Cl. .................. 204/157.1 H; 204/157.1 R; 250/423 P
[58] Field of Search ............ 250/423 P; 204/157.1 R, 204/157.1 H

[56] References Cited

U.S. PATENT DOCUMENTS

| | | | |
|---|---|---|---|
| 3,937,956 | 2/1976 | Lyon | 250/290 |
| 4,049,515 | 9/1977 | Robinson et al. | 204/157.1 R |
| 4,144,453 | 3/1979 | Rigny | 250/423 P |
| 4,158,614 | 6/1979 | Schuster | 204/157.1 R |

FOREIGN PATENT DOCUMENTS 807117 5/1974 Belgium.
2324779 4/1975 Fed. Rep. of Germany.

OTHER PUBLICATIONS

Alimpier, S. S. et al., "Dissociation of Uranium Hexafluoride Molecules in a Two-Frequency Infrared Laser Field", *Sov. J. Quant. Elect.*, 9(10):1263–1265, 10/79.

Ambartsumyan, R. V. et al., "Selectivity of Dissociation of Polyatomic Molecules in a Two Frequency IR Laser Field", *JETP Lett.* 23(4):194–197, 2/76.

Tiee, J. J. et al., "The Photodissociation of $UF_6$ Using Infrared Lasers", *Optics Comm.*, 12/78.

Karlov, N. V., "Laser-Induced Chemical Reactions", *Applied Opt.* 13(2):301–309, 2/74.

Jetter, H. et al., "Uranium Isotope Separation Using IR-Lasers", In *Uranium Isotope Separation*, (Proc. of the Int. Conf. by Brit. Nuc. Energy Soc.), 3/5-7/75, pp. 1–6.

Robinson, C. P. et al., Doe Report #LA–UR–76–191 (Presented 2/25/76 at the American Physical Society).

Robinson, C. P. (Robinson II), "Laser Isotope Separation", Rept. #LA–UR–75–1090, [Presented at 2nd Laser Spectroscopy Conf., Megeue, France 6/23-8/75].

*Primary Examiner*—Richard E. Schafer
*Attorney, Agent, or Firm*—Richard I. Samuel

[57] ABSTRACT

This application discloses a method of separating the isotopes of an element which form a volatile compound having an isotopically shifted but overlapping infrared absorption spectrum. In the method, IR radiation of first and second laser frequencies are employed. The first infrared laser frequency produces a selective excitation of the desired isotope of the compound, while the second infrared laser frequency produces a higher multiphoton excitation which allows conversion of the excited compound.

2 Claims, No Drawings

ISOTOPE SEPARATION PROCESS

CROSS-REFERENCE TO RELATED APPLICATIONS

This is a continuation-in-part of application Ser. No. 797,390 filed May 16, 1977, which in turn was a Rule 60 Continuation of application Ser. No. 614,623 filed Sept. 18, 1975, and also a continuation-in-part of Ser. No. 840,049 filed Oct. 6, 1977 which in turn was a Rule 60 Continuation of application Ser. No. 715,449 filed Aug. 18, 1976, which was a continuation-in-part of Ser. No. 614,623 filed Sept. 18, 1975.

FIELD OF THE INVENTION

This invention relates to a method of separating and enriching the isotopes of an element which forms a volatile compound and which has isotopically shifted but overlapping infrared absorption bands. Particularly, this invention relates to such a method in which more than one laser frequency is employed.

BACKGROUND OF THE INVENTION

In accordance with various prior art teachings, such as U.S. Pat. No. 4,049,515 which issued Sept. 20, 1977, to Robinson et al., an article which appeared in JETP Letters 21, 375, in March, 1975, by Ambartzumian, et al., and disclosure of previoiusly classified information in "Laser Focus", July 1976, pages 8 and 9, it is known that a powerful infrared laser tuned to a fundamental resonance of a polyatomic molecule such as $SF_6$, $SiF_4$ or $BCl_3$ can excite those molecules directly to decomposition; and furthermore in that process enrich an isotope of said molecule. The enrichment occurs because the absorption bands of all isotopes except the pumped isotope of the compound are sufficiently displaced in resonant frequency so as not to be affected by the powerful laser radiation.

Infrared radiation, tuned to a resonant frequency of a molecule, usually will excite the molecule by a single step or quanta. Additional quanta (photons) will usually not be absorbed because the molecular anharmonicity causes the excited molecule to be out of resonance with the excitation frequency. It is, of course, obvious that an additional IR laser resonant with the next level of absorption could theoretically by employed. This would, however, require an undue number of IR lasers. If the initial laser intensity, however, is sufficiently great, a phenomenon known as "power broadening" can help to overcome the disparity in resonance frequencies between the excited and unexcited molecules and provide a means for multiphoton excitation and molecular decomposition. An understanding of this process in molecules is not complete at the present time, but it is known that "power broadening" in itself is not sufficient to explain the process and that the molecules must have a high density of states, approaching a continuum, at energies above the level to which several quanta have been absorbed in order to have the multiphoton absorption continue to decomposition or to a level where chemical reaction with a second compound can occur. Robinson postulated that such a quasi-continuum could be useful and he suggested that this restricted such a multiphoton process to molecules containing four or more atoms. However he considered the process useful for isotope separation only for systems free of hot bands.

The major difficulty in applying the multiphoton absorption process with a single laser to compounds where the isotopic frequency separation is small, and/or where the absorption bands overlap, is that the laser intensity that is required to produce conversion also will produce "power broadening" that will result in a diminished isotopic selectivity. For example, in $UF_6$, $OsO_4$ or $WF_6$, a $CO_2$ laser with the intensity used by Ambartzumian, et al., or Robinson, et al., would substantially reduce selectivity.

BRIEF DESCRIPTION OF THE INVENTION

In accordance with the present invention the above disadvantages are overcome by using a relatively weak first infrared laser that excites the molecule in an isotopically selective step together with a second powerful infrared laser, shifted in frequency from the first laser so as not to "power broaden" the isotopically selective first transition, and which by multiphoton absorption through the quasicontinuum drives the molecule to conversion. The first infrared laser may in itself produce multiphoton excitation and, thereby, a compounding of the single photon isotope selectivity through a judicious choice of its frequency. However a significant improvement in selectivity can only occur if the power broadening is small compared with the isotopic frequency shift.

DETAILED DESCRIPTION OF THE INVENTION

The instant invention is a two-step process, the first step being a combination of isotopically selective excitation and conversion, and the second step being the recovery and separation of the converted molecules from the unconverted molecules by means known in the art. This combination excitation and conversion is accomplished by simultaneously irradiating gas phase molecules which contain the element whose isotopes are to be separated with infrared radiation at two different wavelengths. One of these radiations may be called the resonant radiation because its wavelength must correspond to an absorption band of the molecules which in turn corresponds to a mode of molecular motion in which there is participation by atoms of said element. If the said gas phase molecules are $UF_6$ then it is preferred to use a resonant radiation in one of the following wavelength ranges: 1888 to 1852 $cm^{-1}$, 1300 to 1280 $cm^{-1}$, 1170 to 1143 $cm^{-1}$, 636 to 613 $cm^{-1}$, and 196 to 186 $cm^{-1}$. There is no high power requirement for the resonance radiation. The second radiation may be called the non-resonant radiation or off-resonant radiation and for it high power is required. For dissociation of $UF_6$ by this process it is believed that the second radiation should be in excess of $10^6$ watts per $cm^2$. There is no required relationship between the wavelength of the non-resonant radiation and absorption bands of the molecules, hence any high power laser may be used. However, it is preferable that the frequency of the high power radiation be close to a resonance of the molecule excited by the lower power radiation. Hence the non-resonant radiation may be off-resonant.

Because of their high efficiencies the $CO_2$, CO, HF, and DF lasers are preferred. It is also preferred that the time during which the molecules are subject to irradiation be less than $10^{-5}$ seconds and most preferred that said time be less than $10^{-7}$ seconds. The time interval selected should be related to the mean time between collisions of the molecules so that selectivity is not lost through collisional processes.

The preferred mode of conversion is unimolecular decomposition, i.e., the irradiated molecules receive sufficient energy that they decompose. It is, however, within the scope of the instant invention that the irradiated molecules receive an amount of energy which is insufficient to cause decomposition but which causes them to react with some other gas phase molecule also present in the irradiated volume.

The simplest description of the combination excitation conversion step is in terms of sequential process. The resonant radiation causes an isotopically selective excitation of the molecules. The excited molecules have a greater density of vibrational states available for further excitation than do the unexcited molecules and therefore more readily undergo nonlinear absorption of the high power non-resonant radiation leading to their decomposition. High power non-resonant radiation means in the context of this application radiation which is not absorbed by the fundamental molecular vibration. This description, however, implies that the high power non-resonant radiation does not influence the absorption of the resonant radiation. It is within the scope of this invention to operate under conditions such that said implication is valid but it is also within the scope of this invention to use conditions such that the high power non-resonant radiation interacts significantly with the absorption of the resonant radiation. It is further within the scope of this invention that the high power laser non-resonant radiation in the context of direct absorption of the radiation may inelastically scatter according to a Raman process such that the equivalent of multiphoton vibrational excitation is achieved. In the presence of the large photon yield this may approach a stimulated scattering process with a cross section larger than observed at lower yields. Due to the high density of states of the molecules a resonant Raman scattering process may prevail.

PREFERRED EMBODIMENT

Uranium ore of natural isotopic distribution is converted to $UF_6$ by means well known in the art. Said $UF_6$ is simultaneously irradiated with infrared low power resonant radiation in the wavelength range 636 to 613 cm$^{-1}$ and with infrared radiation from a $CO_2$ laser at a power density greater than $10^8$ watts per cm$^2$, for a time of less than $10^{-5}$ seconds, whereby the $UF_6$ is decomposed in an isotopically selective manner.

The low power resonant radiation has to be sufficiently intense to excite the molecule to enable the absorption of the off-resonant high power radiation. The low power radiation intensity should not exceed values which produce such level broadening that isotope selectivity is lost. For the $\nu_3$ transition of $UF_6$, 636-613 cm$^{-1}$, this intensity is limited to the range of 100 watts per cm$^2$ to $10^6$ watts per cm$^2$.

The high intensity radiation must be at a frequency and have an intensity such that it does not contribute to the level broadening to the detriment of isotope selectivity achieved by the low power radiation alone. It is preferable that the frequency of the high power radiation should be close to a resonance of the molecule excited by the low power radiation.

The wavelengths, bandwidth, energy, pulsewidth, and pulse temporal character of both the low power and high power radiation has to be adjusted to provide maximum yield at optimal isotope separation.

The decomposed molecules are then recovered and separated from the undecomposed molecules thus forming isotopically enriched and depleted uranium, said separation and recovery being done by means known in the art. The techniques of staging isotope separation are well known and should greater depletion of the depleted uranium or greater enrichment of the enriched uranium be desired the separation process may be repeated according to the well known techniques.

We claim:

1. A method of separating the isotopes of an element which forms a volatile compound having an isotopically shifted but overlapping infrared absorption spectrum; the method including the steps of:
   (a) irradiating said volatile compound with a first infrared radiation of low power which is preferentially absorbed by a molecular vibration of molecules of said compound containing a predetermined isotope of said element thereby providing excited molecules of said compound enriched in said molecules of said compound containing said predetermined isotope of said element;
   (b) irradiating said volatile compound with a second infrared radiation of high power which is not substantially absorbed by said molecular vibration of said molecule at an intensity sufficient to further excite said excited molecules to undergo a conversion said second infrared radiation being shifted in frequency from the frequency of the first radiation so as not to cause power broadening of the preferential absorption transition; and
   (c) separating the converted molecules from the unconverted molecules.

2. The method as defined in claim 1 in which said conversion is achieved by decomposition.

* * * * *